(12) United States Patent
Rayes et al.

(10) Patent No.: US 10,937,113 B2
(45) Date of Patent: Mar. 2, 2021

(54) ENERGY RESOURCE PRE-ALLOCATION AND DELIVERY BASED ON DEMAND

(71) Applicant: GM GLOBAL TECHNOLOGY OPERATIONS LLC, Detroit, MI (US)

(72) Inventors: Freddy V. Rayes, Shelby Township, MI (US); Allan K. Lewis, Windsor (CA); Apral S. Hara, Lasalle (CA); Kunaal Verma, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 16/212,146

(22) Filed: Dec. 6, 2018

(65) Prior Publication Data
US 2020/0184576 A1    Jun. 11, 2020

(51) Int. Cl.
*G06Q 50/06* (2012.01)
*G06Q 10/06* (2012.01)

(52) U.S. Cl.
CPC ....... *G06Q 50/06* (2013.01); *G06Q 10/06315* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 8,473,131 B2* | 6/2013 | Leary | ................. | B60L 11/1818 701/22 |
| 8,676,636 B2* | 3/2014 | Genschel | ............... | G06Q 50/06 705/13 |
| 8,718,850 B2* | 5/2014 | Bozchalui | ............... | B60L 55/00 701/22 |
| 8,718,856 B2* | 5/2014 | Leary | ...................... | B60L 53/35 701/22 |
| 9,409,492 B2* | 8/2016 | Uyeki | ................. | B60L 11/1848 |
| 9,455,577 B2* | 9/2016 | Bhageria | ........... | H02J 13/00006 |
| 9,575,533 B2* | 2/2017 | Watkins | ................ | G07F 15/005 |
| 9,592,742 B1* | 3/2017 | Sosinov | .................. | B60L 53/68 |
| 9,766,671 B2* | 9/2017 | Dorn | ........................ | G08G 1/20 |
| 10,189,362 B2* | 1/2019 | Cun | ......................... | B60L 53/64 |

(Continued)

OTHER PUBLICATIONS

Yong, Jia Ying, et al. "Bi-directional electric vehicle fast charging station with novel reactive power compensation for voltage regulation." International Journal of Electrical Power & Energy Systems 64 (2015): 300-310. (Year: 2015).*

(Continued)

*Primary Examiner* — Alan S Miller
(74) *Attorney, Agent, or Firm* — Cantor Colburn LLP (57) ABSTRACT

Embodiments include methods, systems and computer readable storage medium for demand prediction and energy resource pre-allocation and/or relocation. The method includes monitoring, by a processor, venue event information for one or more locations. The method further includes calculating, by the processor, an energy resource demand based on a charge demand model. The method further includes determining, by the processor, whether the energy resource demand exceeds available energy resource stations provided at the location. The method further includes instructing, by the processor, one or more vehicles having spare energy resources to contribute at least a portion of the spare energy resources to meet the energy resource demand exceeding the available energy resource stations.

17 Claims, 4 Drawing Sheets

(56) References Cited

U.S. PATENT DOCUMENTS

| | | | | |
|---|---|---|---|---|
| 10,346,931 B2* | 7/2019 | Koch | ................ | G06Q 50/06 |
| 10,369,890 B1* | 8/2019 | Sosinov | ................ | B60L 53/126 |
| 10,399,461 B1* | 9/2019 | Sosinov | ................ | B60L 53/68 |
| 10,559,044 B2* | 2/2020 | Liptsey-Rahe | ...... | G06Q 10/067 |
| 2011/0047052 A1* | 2/2011 | Cornish | ................ | H02J 3/32 |
| | | | | 705/30 |
| 2011/0077809 A1* | 3/2011 | Leary | ................ | B60L 53/65 |
| | | | | 701/22 |
| 2011/0276194 A1* | 11/2011 | Emalfarb | ................ | H02J 3/381 |
| | | | | 700/297 |
| 2012/0005125 A1* | 1/2012 | Jammer | ................ | B60L 53/64 |
| | | | | 705/412 |
| 2012/0203726 A1* | 8/2012 | Klabjan | ................ | B60L 53/65 |
| | | | | 706/46 |
| 2013/0054045 A1* | 2/2013 | Ramezani | ............... | B60L 53/67 |
| | | | | 700/297 |
| 2013/0110296 A1* | 5/2013 | Khoo | ................ | B60L 53/14 |
| | | | | 700/286 |
| 2013/0173807 A1* | 7/2013 | De Groot | ................ | H04L 47/70 |
| | | | | 709/226 |
| 2013/0179061 A1* | 7/2013 | Gadh | ................ | B60L 53/63 |
| | | | | 701/123 |
| 2013/0265007 A1* | 10/2013 | Leary | ................ | B60L 53/16 |
| | | | | 320/109 |
| 2014/0028255 A1* | 1/2014 | Brimacombe | .......... | B60L 53/67 |
| | | | | 320/109 |
| 2014/0184170 A1* | 7/2014 | Jeong | ................ | B60L 53/63 |
| | | | | 320/137 |
| 2014/0203077 A1* | 7/2014 | Gadh | ................ | H02J 13/0026 |
| | | | | 235/382 |
| 2015/0262206 A1* | 9/2015 | Dai | ................ | G06Q 50/30 |
| | | | | 705/7.31 |
| 2015/0365383 A1* | 12/2015 | De Groot | ............ | H04L 9/0894 |
| | | | | 713/168 |
| 2016/0300170 A1* | 10/2016 | Sun | ................ | G06Q 50/06 |
| 2017/0148114 A1* | 5/2017 | Liptsey-Rahe | ............... | |
| | | | | G06Q 10/06315 |
| 2017/0176195 A1* | 6/2017 | Rajagopalan | ........... | B60L 58/12 |
| 2018/0186357 A1* | 7/2018 | Deshpande | ........... | B60W 10/08 |
| 2019/0061552 A1* | 2/2019 | Amari | ................ | H02J 13/0006 |
| 2019/0107406 A1* | 4/2019 | Cox | ................ | G01C 21/3679 |
| 2019/0280509 A1* | 9/2019 | Yokoyama | ........... | H01M 10/425 |
| 2019/0288347 A1* | 9/2019 | Yokoyama | ............ | H01M 10/42 |
| 2019/0359065 A1* | 11/2019 | Al-Awami | ............ | G05D 1/0291 |
| 2020/0062138 A1* | 2/2020 | Smolenaers | ........... | H02J 7/0027 |
| 2020/0065718 A1* | 2/2020 | Moore | ................ | G06Q 10/02 |
| 2020/0094686 A1* | 3/2020 | Moon | ................ | B60L 53/67 |
| 2020/0101859 A1* | 4/2020 | Baxter | ................ | H02J 7/00036 |
| 2020/0177026 A1* | 6/2020 | Sosinov | ................ | B60L 53/38 |

OTHER PUBLICATIONS

"Challenges for Plug in Electric Vehicle Infrastructure", George Bellino, Manager Strategic Programs, General Motors Corporation, presentation at Plug-In 2008 Conference (Year: 2008).*

* cited by examiner

ENERGY RESOURCE PRE-ALLOCATION AND DELIVERY BASED ON DEMAND

INTRODUCTION

The subject disclosure relates to resource pre-allocation and relocation, and more specifically to locating energy resources based on a demand determination.

An electric vehicle (EV) uses one or more electric motors or traction motors for propulsion. An EV may be powered through a collector system by electricity from off-vehicle sources, or may be self-contained with a battery, solar panels or an electric generator to convert fuel to electricity. There are two basic types of EVs: all-electric vehicles (AEVs) and plug-in hybrid electric vehicles (PHEVs). AEVs include Battery Electric Vehicles (BEVs) and Fuel Cell Electric Vehicles (FCEVs). In addition to charging from the electrical grid, both types are charged in part by regenerative braking, which generates electricity from some of the energy normally lost when braking. AEVs run only on electricity. Most AEVs have all-electric ranges of 80 to 100 miles, while a few luxury models have ranges up to 250 miles. When the battery of an AEV is depleted, it can take from 30 minutes (with fast charging) up to nearly a full day to recharge the battery.

Given the battery range of most AEVs and the time needed to recharge the battery, it is desirable to provide a resource pre-allocation and relocation system that can provide energy resources for AEVs at pre-determined locations in consideration of an estimated demand at those locations.

SUMMARY

In one exemplary embodiment, a method for demand prediction and energy resource pre-allocation and/or relocation is disclosed. The method includes monitoring, by a processor, venue event information for one or more locations. The method further includes calculating, by the processor, an energy resource demand based on a charge demand model. The method further includes determining, by the processor, whether the energy resource demand exceeds available energy resource stations provided at the location. The method further includes instructing, by the processor, one or more vehicles having spare energy resources to contribute at least a portion of the spare energy resources to meet the energy resource demand exceeding the available resource stations.

In addition to one or more of the features described herein, the demand prediction and energy resource pre-allocation and/or relocation can additionally transfer the at least a portion of the spare energy resources to one or more receiving vehicles. The demand prediction and energy resource pre-allocation and/or relocation can also determine whether the energy resource demand exceeds available energy resource stations provided at the location and spare energy contributions provided by the one or more vehicles having spare energy resources and dispatch one or more mobile energy resource stations to the location to meet the energy resource demand exceeding the available energy resource stations and spare energy contributions provided by the one or more vehicles having spare energy resources. The demand prediction and energy resource pre-allocation and/or relocation can also determine an occurrence of an event or large gathering based on the venue event information. The demand prediction and energy resource pre-allocation and/or relocation can estimate a number of vehicles traveling to the location and determine a state of charge for one or more receiving vehicles of the vehicles traveling to the location. The one or more receiving vehicles can be electric vehicles. The charge demand model for the demand prediction and energy resource pre-allocation and/or relocation can be based on a state of charge for one or more receiving vehicles and the available energy resource stations provided at the location.

In another exemplary embodiment, a system for demand prediction and energy resource pre-allocation and/or relocation is disclosed herein. The system includes a memory and processor in which the processor monitors venue event information for one or more locations. The processor further calculates an energy resource demand based on a charge demand model. The processor further determines whether the energy resource demand exceeds available resource stations provided at the location. The processor further instructs one or more vehicles having spare energy resources to contribute at least a portion of the spare energy resources to meet the energy resource demand exceeding the available resource stations.

In yet another exemplary embodiment a computer readable storage medium for demand prediction and energy resource pre-allocation and/or relocation is disclosed herein. The computer readable storage medium includes monitoring venue event information for one or more locations. The computer readable storage medium further includes calculating an energy resource demand based on a charge demand model. The computer readable storage medium further includes determining whether the energy resource demand exceeds available resource stations provided at the location. The computer readable storage medium further includes instructing one or more vehicles having spare energy resources to contribute at least a portion of the spare energy resources to meet the energy resource demand exceeding the available resource stations.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
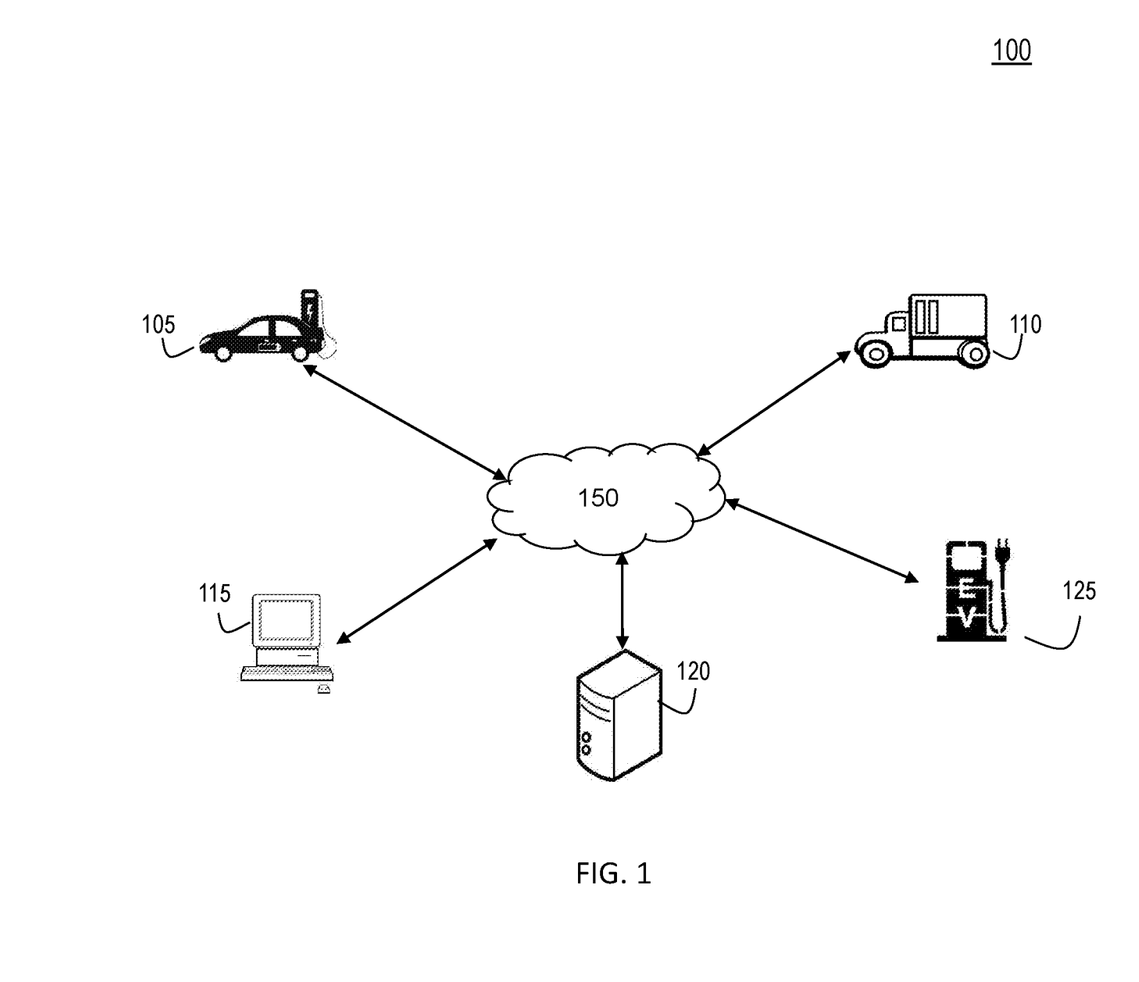
FIG. 1 is a computing environment according to one or more embodiments.

In accordance with an exemplary embodiment, FIG. 1 illustrates a computing environment used by a resource pre-allocation and relocation system 100. As shown, the computing environment for the resource pre-allocation and relocation system 100 comprises one or more computing devices, for example, one or more servers 120, as well as one or more computers 115. The system 100 also includes one or more mobile resources, for example, an automobile onboard computer system of a vehicle 105 (e.g., an electric vehicle (EV)), which may or may not be autonomous. The system 100 further includes an automobile onboard computer system of a mobile energy resource/transport 110 and a mobile energy resource station 125, which can be transported by the mobile energy resource/transport 110, which are connected via network 150. The one or more computing devices can communicate with one another using network 150.

Network 150 can be, for example, a local area network (LAN), a wide area network (WAN), such as the Internet, a dedicated short range communications network, or any combination thereof, and may include wired, wireless, fiber optic, or any other connection. Network 150 can be any combination of connections and protocols that will support communication between the server 120, computer 115, and an automobile onboard computer system of one or more mobile resources 105 and 110, respectively.

The EV 105 and the mobile energy resource/transport 110 can include a GPS transmitter/receiver (not shown) which is operable for receiving location signals from the plurality of GPS satellites (not shown) that provide signals representative of a location for each of the mobile resources, respectively. In addition to the GPS transmitter/receiver, each EV 105 and the mobile energy resource/transport 110 can include a navigation processing system (not shown) that can be arranged to communicate with a server 120 through the network 150. Accordingly, the EV 105 and the mobile energy resource/transport 110 are able to determine location information and transmit that location information to the server 120 and the computer 115, where the location information of the EV 105 and the mobile energy resource/transport 110 can be tracked and stored.

Figure 2:
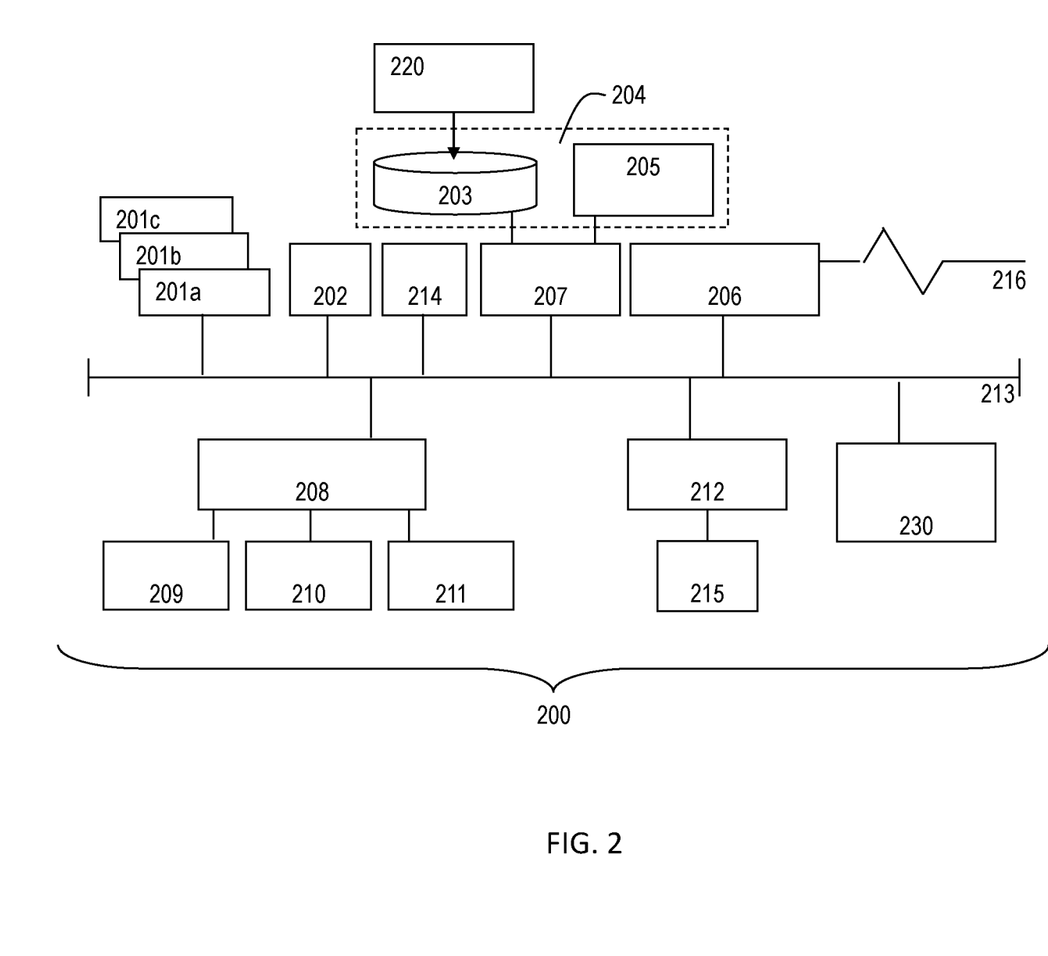
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as the server 120, computer 115, the EV 105, the mobile energy resource/transport 110 and the mobile energy resource station 125.

The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or other storage drive 205 or any other similar component. I/O adapter 207, hard disk 203, and other storage device 205 are collectively referred to herein as mass storage 204. Operating system 220 for execution on the processing system 200 may be stored in mass storage 204. A network adapter 206 interconnects bus 213 with an outside network 216 enabling data processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 can all be interconnected to bus 213 via user interface adapter 208, which may include, for example, a Super I/O chip integrating multiple device adapters into a single integrated circuit.

The processing system 200 may additionally include a graphics-processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system to coordinate the functions of the various components shown in FIG. 2.

The one or more computing devices may further include a transmitter and receiver (not shown), to transmit and receive information. The signals sent and received may include data, communication, and/or other propagated signals. Further, it should be noted that the functions of transmitter and receiver could be combined into a signal transceiver.

Figure 3:
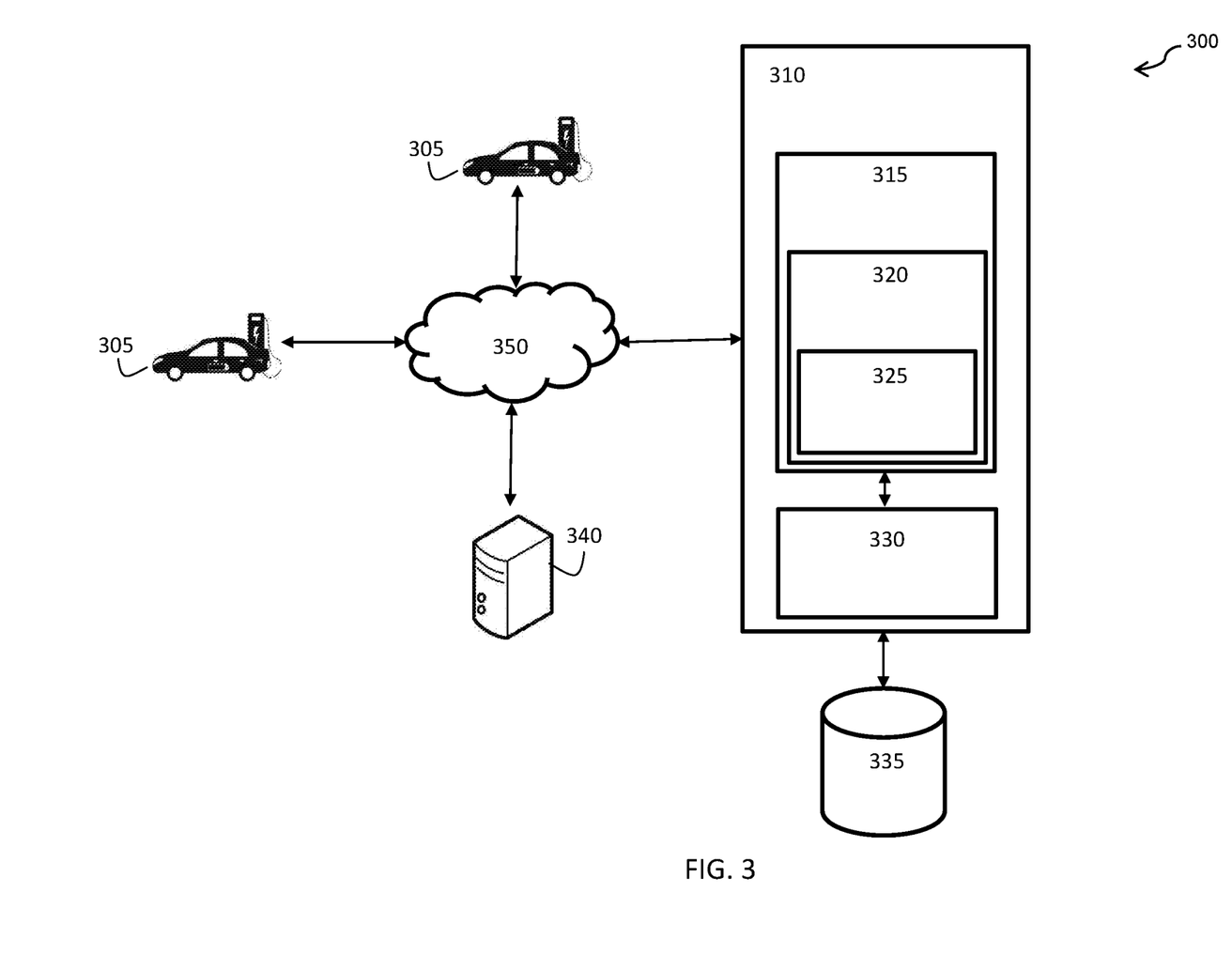
FIG. 3 is a block diagram illustrating an energy resource pre-allocation and/or relocation system according to one or more embodiments.

In accordance with an exemplary embodiment, FIG. 3 depicts a block diagram illustrating an energy resource pre-allocation and/or relocation system 300 according to one or more embodiments. As illustrated, the computing system 300 can include but is not limited to one or more vehicles 305 (autonomous or non-autonomous electric vehicles (EV)), i.e., a vehicle having a battery capable of being charged using an external source. The computing system 300 also includes a resource pre-allocation and relocation server 310 and an event location server 340 connected over one or more networks, for example, network 350.

The one or more vehicles 305 can each provide the resource pre-allocation and relocation server 310 with a vehicle destination and current state of charge (SOC). The event location server 340 can provide the resource pre-allocation and relocation server 310 with scheduled events (e.g., a calendar of scheduled events) for a pre-determined location (e.g., a city, portion of a city and/or one or more venues within a predetermined radius of the location along with a starting time and scheduled event duration.) The event location server 340 can provide social media information and rideshare service information to the resource pre-allocation and relocation server 310, which can be used to correlate locations where events or gatherings are due to take place. The event location server 340 can additionally provide energy resource information (e.g., a number of energy resource locations which can include vehicle charging stations (wired and/or wireless) for a given event location to the resource pre-allocation and relocation server 310. The vehicle charging stations can include public Level 2 and direct current (DC) fast charging stations.

The event location server 340 can also provide transit pattern behavior data associated with the pre-determined location before, during and after an associated scheduled event (i.e., a venue distribution of attendees that changes depending on the type and size of event being held at the venue). For example, when a venue hosts a sporting event, 30% of attendees take public transportation while 70% drive, take a taxi or use a ridesharing service, but for a concert 10% of attendees take public transportation while 90% drive, take a taxi or use a ridesharing service. Pattern behavior data can also include traffic data, including historic traffic density information and real-time traffic information at the pre-determined location due to the scheduled event.

The resource pre-allocation and relocation server 310 can include a demand forecast module 315 and a resource dispatch service module 330. The demand forecast module 315 can also include a charge demand model 320, which further includes a balancing service module 325.

The demand forecast module 315 can use the received scheduled event information, social media information and rideshare service information to predict/estimate an event attendance. Based on the predicted event attendance, the demand forecast module 315 can predict an energy resource demand (i.e., vehicle charge, fuel and/or another energy resource) at the event. The energy resource demand prediction can be based on a projected ownership of EVs within a given region/location. The demand forecast module 315 can also use the pattern behavior information provided by the event location server 340, as well as destination and SOC information for each vehicle 305 to further refine the predicted energy resource demand.

The charge demand model 320 can utilize the predicted energy resource demand in conjunction with energy resource information for an event location to create the charge station to EV ratio model, which can be used to determine whether or not sufficient energy resource stations, i.e., charging stations, exist at the event location to handle the predicted energy resource demand. The charge demand model 320 can make real-time adjustments to EV ratio model if real-time energy resource demand information differs from the predicted energy resource demand. If charging stations at the event location are sufficient to handle the predicted energy resource demand, the resource pre-allocation and relocation server 310 can monitor the event location to determine whether the charging stations at the event location meet an actual/real-time energy resource demand in order to determine whether additional energy resources are needed.

If charging stations at the event location are insufficient to handle the predicted energy resource demand, the balancing service 325 can attempt to meet the energy resource demand not met by the event location charging stations by determining whether one or more vehicles 305 that are currently at the event location or will be at the event location each have spare energy resources (i.e., battery charge) in addition to an amount needed to return to an origination location (e.g., a home location), and/or rideshare vehicles at the event location that are not currently assisting customers have spare energy resources (i.e., additional battery charge) which can be provided to one or more designated vehicles 305 demanding energy resources. If the balancing service 325 determines that the one or more vehicles 305 having spare energy resources and/or rideshare vehicles can assist in meeting the energy resource demand, the charge demand model 320 can re-calculate the EV ratio model to determine whether or not the on-site charging stations and determined energy resource contributions by the personal vehicles and/or rideshare vehicles meet the predicted energy resource demand.

If the re-calculated EV ratio model indicates that the charging stations and determined energy resource contributions by the one or more vehicles 305 having spare energy resources and/or rideshare vehicles meet the predicted energy resource demand, the resource dispatch service module 330 can communicate with each of the one or more vehicles 305 having spare energy resources and/or the rideshare vehicles designated to contribute spare energy resources to meet the predicted energy resource demand in order to coordinate transfer of associated spare energy resources to one or more designated vehicles 305. The resource dispatch service module 330 can additionally communicate with one or more members of a charge servicing staff at the event location. Accordingly, the one or more members of the charge servicing staff at the event location can facilitate a spare energy resource transfer from the personal vehicles and/or rideshare vehicles to the one or more designated vehicles 305 by manually or automatically transferring energy resources (e.g. battery charge) from the one or more vehicles 305 having spare energy resources to the one or more designated vehicles 305 via a wired or wireless connection.

If the re-calculated EV ratio model indicates that the charging stations and determined energy resource contributions by the one or more vehicles 305 having spare energy resources and/or rideshare vehicles do not meet the predicted energy resource demand, the resource dispatch service module 330 can communicate with one or more mobile energy resource/transports 110. The resource dispatch service module 330 can instruct the one or more mobile energy resource/transports 110 to re-locate to the event location in order to provide additional energy resources to the one or more designated vehicles 305. The calculated EV ratio model and re-calculated EV ratio model can be determined prior to an event thereby allowing for additional energy resources to be designated and/or cause one or more mobile energy resource/transports 110 to be re-located to the event location before the event occurs (i.e., energy resource pre-allocation). The resource pre-allocation and relocation server 310 can monitor the event location to determine whether an actual/real-time energy resource demand is being met and coordinate additional energy resources to be relocated to the event location if the actual/real-time energy resource demand is not met, or relocate energy resources (i.e., one or more autonomous rideshare vehicles and/or a mobile energy transport 110) from the event location if energy resources exceed the actual/real-time energy resource demand.

The calculated EV ratio model and/or re-calculated EV ratio model for an event location can be stored in the forecast datastore 335. Additionally information provided to the resource pre-allocation and relocation server 310 by the event location server 340 and/or one or more vehicles 305 can be stored in the forecast datastore 335.

An exemplary scenario based on the computing system 300 can be in reference to two individuals (individual A and individual B) attending a sporting event. Individual A drives to the sporting event in an EV. Individual B uses a rideshare service to obtain transport to the sporting event in an autonomous vehicle (AV). While individual A had enough charge to travel to the sporting event, the EV of individual A does not have sufficient charge to return to an origination location associated with individual A. After the AV transports individual B to the sporting event, the AV can provide energy resources (i.e., charge) to the EV of individual A in order for individual A to return to the origination location. Individual A can make a request for charge using for example, an application (app) stored on Individual A's mobile device. One or more members of a charge servicing staff at the event location can transfer charge from the AV to the EV.

Another exemplary scenario based on the computing system 300 can be in reference to an individual attending a sporting event. The individual drives to the sporting event in an EV but does not have enough charge to return to an origination location. The individual is unable to find a free charging station upon arrival at the sporting event. The individual can make a request for charge using, for example, an application (app) stored on individual's mobile device. A dispatch service can designate a charge donor vehicle, and one or more members of a charge servicing staff at the event location can transfer charge from the charge donor vehicle to the EV.

Another exemplary scenario based on the computing system 300 can be in reference to an individual attending an automotive expo. The individual drives to the automotive expo in an EV but does not have enough charge to return to an origination location. The location hosting the automotive expo has a number of charging stations, for example, 5 charging stations. A server, for example the resource pre-allocation and relocation server 310 can use a pre-allocation algorithm to estimate a portion of EVs that will be at the event and determine that EVs needing to use a charge station (charge demand) exceeds the 5 available charging stations by calculating a ratio of EVs to available charging stations). Rideshare information can be provided to the server from another server, for example, the event location server 340 indicating that historically rideshare use/request to/at the automotive expo is low, i.e., most attendees travel to the event using their own vehicles or use public transportation. Because additional vehicles (rideshare) are not available to transfer surplus charge to other vehicles, a resource dispatch service of the server can cause one or more dedicated mobile charge stations to be sent to the automotive expo prior to the start of the event in order to expand the amount of chargers available.

While the scenarios provided are event related, the supplementing of charging stations at a given location using EVs/AVs or mobile charge stations are not limited to event locations. For example, similar scenarios based on the computing system 300 can be related to charge pre-allocation/allocation at an airport, train station, work location, etc. Additional information may be used and/or predicted to operate the computing system 300 in other scenarios, for example, flight information or a work schedule.

Figure 4:
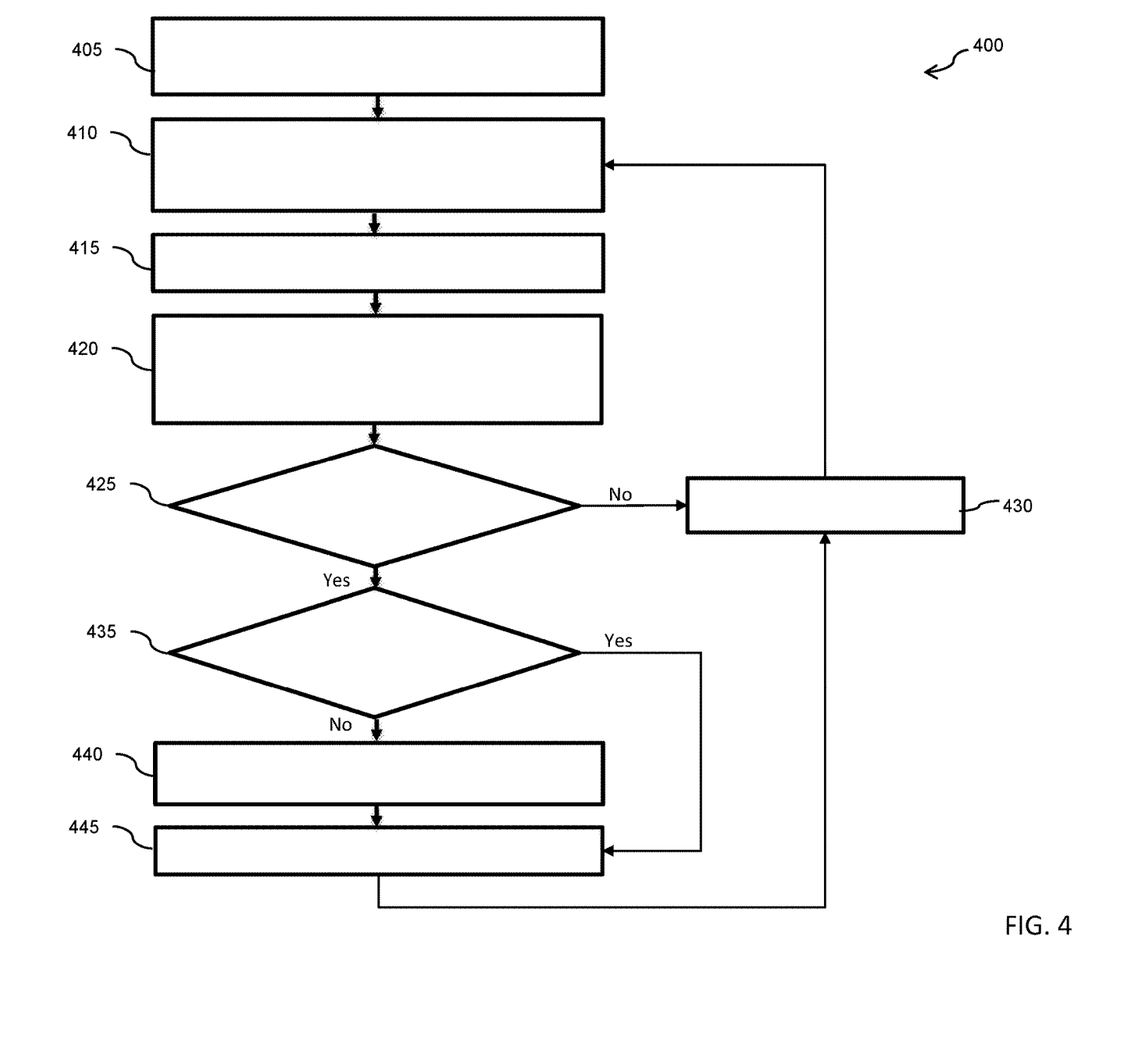
FIG. 4 is a flow diagram of a method for demand prediction and energy resource pre-allocation and/or relocation according to one or more embodiments.

FIG. 4 depicts a flow diagram of a method 400 for demand prediction and energy resource pre-allocation and/or relocation according to one or more embodiments. At block 405, a server, for example, a resource pre-allocation and relocation server 310, can monitor a calendar, social media references and acknowledgements, and historic traffic data (i.e., venue event information) related to an event or gathering due to occur.

At block 410, the server can estimate a number of electric vehicles (EVs) that are likely to be used to travel to the event or gathering and a state of charge (SOC) for each EV. The estimate can be based on an estimated number of attendees for the event or gathering, a coefficient of EVs in a given market and alternative means of transport to the event or gathering, e.g., public transportation. At block 415, the server can determine a number of available energy resource stations, i.e., charging stations, located at the event or gathering. At block 420, the server can calculate an energy resource demand at the event or gathering using a charge demand model. The charge demand model can utilize the SOC for each EV and the determined number of available energy resource stations located at the event or gathering to calculate the energy resource demand. At block 425, the server can determine whether the energy resource demand is greater than the number of available energy resource stations.

If, at block 435, the server determines that the energy resource demand is not greater than the number of available energy resource stations, the method 400 proceeds to block 430, where the server can continue to monitor the event or gathering for changes in demand. The method 400 would then return to block 410.

If the server determines that the energy resource demand is greater than the number of available energy resource stations, the method 400 proceeds to block 435, where the server can determine whether EVs at the event or gathering can assist in meeting an amount of energy resources that cannot be met by the number of available energy resource stations, i.e., an energy deficiency=calculated energy demand−energy that can be provided by the available energy resource stations. For example, one or more EVs, which may be autonomous, i.e., (AV), at the event or gathering having an excess/spare charge can be used as an energy/charge resource.

If the server determines that the EVs at the event or gathering cannot assist in meeting an amount of energy resources that cannot be met by the number of available energy resource stations, the method 400 proceeds to block 440 where the server can dispatch one or more mobile energy resource stations (e.g., charging stations and/or EVs and/or AVs that are not located at the event). The number of energy resource stations can be based on the energy deficiency, which may or may not include potential energy resource contributions from EVs at the event or gathering. The method 400 then proceeds to block 445, where the server can coordinate a transfer of energy resources (charge) to an EV determined to need additional energy resources. The method 400 would return to block 430.

If, at block 435, the server determines that the EVs at the event or gathering can assist in meeting an amount of energy resources that cannot be met by the number of available energy resource stations, the method 400 proceeds to block 445 where the server can coordinate a transfer of energy resources (charge) to an EV determined to need additional energy resources. The method 400 would return to block 430.

Accordingly, the embodiments disclosed herein provide an energy resource pre-allocation and/or relocation system that can pre-stage energy sources at a location in order to meet a customer energy resource demand exceeding available energy resources that can be provided at the location. The system can re-utilize electric vehicles that can include an autonomous vehicle (AV) fleet transporting attendees for new purposes (i.e., transferring energy resource) to meet the energy resource demand. The AV fleet can be return to ridesharing operations upon completion of energy resource transfer to meet the energy resource demand.

The system can also use a state of charge (SOC) to predict a charge demand at an event location or gathering area and time in which a high mobile charging demand is likely. The system can further determine a charge station to EV ratio using a model for evaluating a charge demand. The model can output a demand curve based on upcoming events, which takes into account an assessment of the normal usage. In situations where the evaluation indicates that charge demand exceeds available resources, energy resources (i.e. autonomous vehicles and mobile energy resource stations (e.g., charging stations)) can be routed to the area of demand ahead of a predicted time energy resources will be needed and/or during the predicted time. The model can be used to find opportunities to provide higher quality/level of charge than what non-DC charging implementations can provide at a specific location, as well as offering DC chargers where few exist near that location.

Accordingly, a driver of an EV can charge the EV at a location even though available charging stations at the location cannot be utilized. Benefits of the system described herein can include: providing additional revenue for one or more companies (e.g., venue owners, rideshare services owners, fleet management owners, vehicle manufacturers, as well as news companies providing mobile charging services and coordination), increasing the utilization of autonomous vehicles (AVs) at a location when the AVs are not providing rideshare services, offer local rides instead of longer distance rides for vehicles which have completed a charge delivery task, and/or reduce a recharge time and recharge complexity for customers with minimal effort from the customer.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for demand prediction and energy resource pre-allocation and/or relocation, the method comprising:
   monitoring, by a processor, venue event information for one or more locations;
   calculating, by the processor, an energy resource demand based on a charge demand model;
   determining, by the processor, whether the energy resource demand exceeds available energy resource stations provided at the location;
   instructing, by the processor, one or more vehicles having spare energy resources to contribute at least a portion of the spare energy resources to meet the energy resource demand exceeding the available energy resource stations; and
   transferring the at least a portion of the spare energy resources to one or more receiving vehicles.

2. The method of claim 1 further comprising:
   determining whether the energy resource demand exceeds available energy resource stations provided at the location and spare energy contributions provided by the one or more vehicles having spare energy resources; and
   dispatching one or more mobile energy resource stations to the location to meet the energy resource demand exceeding the available energy resource stations and spare energy contributions provided by the one or more vehicles having spare energy resources.

3. The method of claim 1 further comprising determining an occurrence of an event or large gathering based on the venue event information.

4. The method of claim 1 further comprising:
   estimating a number of vehicles traveling to the location; and
   determining a state of charge for one or more receiving vehicles of the vehicles traveling to the location.

5. The method of claim 4, wherein the one or more receiving vehicles are electric vehicles.

6. The method of claim 1, wherein the charge demand model is based on a state of charge for one or more receiving vehicles and the available energy resource stations provided at the location.

7. A system for demand prediction and energy resource pre-allocation and/or relocation, the system comprising:
   a memory; and
   a processor coupled to the memory, wherein the processor is operable to:
      monitor venue event information for one or more locations;
      calculate an energy resource demand based on a charge demand model;
      determine whether the energy resource demand exceeds available energy resource stations provided at the location; and
      instruct one or more vehicles having spare energy resources to contribute at least a portion of the spare energy resources to meet the energy resource demand exceeding the available energy resource stations, wherein at least a portion of the spare energy resources are transferred to one or more receiving vehicles.

8. The system of claim 7, wherein the processor is further operable to:
 determine whether the energy resource demand exceeds available energy resource stations provided at the location and spare energy contributions provided by the one or more vehicles having spare energy resources; and
 dispatch one or more mobile energy resource stations to the location to meet the energy resource demand exceeding the available energy resource stations and spare energy contributions provided by the one or more vehicles having spare energy resources.

9. The system of claim 7, wherein the processor is further operable to determine an occurrence of an event or large gathering based on the venue event information.

10. The system of claim 7, wherein the processor is further operable to:
 estimate a number of vehicles traveling to the location; and
 determine a state of charge for one or more receiving vehicles of the vehicles traveling to the location.

11. The system of claim 10, wherein the one or more receiving vehicles are electric vehicles.

12. The system of claim 7, wherein the charge demand model is based on a state of charge for one or more receiving vehicles and the available energy resource stations provided at the location.

13. A non-transitory computer readable storage medium having program instructions embodied therewith, the program instructions readable by a processor to cause the processor to perform a method for demand prediction and energy resource pre-allocation and/or relocation comprising:
 monitoring venue event information for one or more locations;
 calculating an energy resource demand based on a charge demand model;
 determining whether the energy resource demand exceeds available energy resource stations provided at the location; and
 instructing one or more vehicles having spare energy resources to contribute at least a portion of the spare energy resources to meet the energy resource demand exceeding the available energy resource stations; wherein at least a portion of the spare energy resources are transferred to one or more receiving vehicles.

14. The computer readable storage medium of claim 13 further comprising:
 determining whether the energy resource demand exceeds available energy resource stations provided at the location and spare energy contributions provided by the one or more vehicles having spare energy resources; and
 dispatching, by the processor, one or more mobile energy resource stations to the location to meet the energy resource demand exceeding the available energy resource stations and spare energy contributions provided by the one or more vehicles having spare energy resources.

15. The computer readable storage medium of claim 13 further comprising determining an occurrence of an event or large gathering based on the venue event information.

16. The computer readable storage medium of claim 13 further comprising:
 estimating a number of vehicles traveling to the location; and
 determining a state of charge for one or more receiving vehicles of the vehicles traveling to the location.

17. The computer readable storage medium of claim 16 wherein the one or more receiving vehicles are electric vehicles.

* * * * *